United States Patent
Belter et al.

(10) Patent No.: US 9,903,251 B1
(45) Date of Patent: Feb. 27, 2018

(54) OUTBOARD MOTORS AND EXHAUST SYSTEMS FOR OUTBOARD MOTORS HAVING AN EXHAUST CONDUIT SUPPORTED INSIDE THE V-SHAPE

(71) Applicant: Brunswick Corporation, Lake Forest, IL (US)

(72) Inventors: David J. Belter, Oshkosh, WI (US); Jeffrey J. Broman, Slinger, WI (US); Mark J. Glodowski, De Pere, WI (US); Douglas D. Reichardt, West Bend, WI (US); Timothy S. Reid, Eden, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/363,280

(22) Filed: Nov. 29, 2016

Related U.S. Application Data

(63) Continuation-in-part of application No. 14/923,965, filed on Oct. 27, 2015, now Pat. No. 9,616,987, which
(Continued)

(51) Int. Cl.
*F01N 3/04* (2006.01)
*F01N 13/10* (2010.01)
(Continued)

(52) U.S. Cl.
CPC ............. *F01N 13/10* (2013.01); *F01N 13/18* (2013.01); *F02B 61/045* (2013.01); *F02B 75/221* (2013.01)

(58) Field of Classification Search
CPC ................................ F01N 13/10; F01N 13/18
See application file for complete search history.

(56) References Cited

U.S. PATENT DOCUMENTS

| 1,862,723 A | 6/1932 | Summers |
| 2,305,295 A | 10/1940 | Lang et al. |

(Continued)

FOREIGN PATENT DOCUMENTS

| CA | 1285883 | 7/1991 |
| DE | 664031 | 10/1938 |

(Continued)

OTHER PUBLICATIONS

Mercury Marine Service Manual: Models 175×R2 Sport Jet Mercury Marine; Nov. 1997.

*Primary Examiner* — Stephen P Avila
(74) *Attorney, Agent, or Firm* — Andrus Intellectual Property Law, LLP

(57) ABSTRACT

An internal combustion engine for an outboard motor comprises a cylinder block having first and second banks of cylinders that extend transversely with respect to each other in a V-shape so as to define a valley there between. An exhaust manifold conveys exhaust gas from the internal combustion engine and is at least partially disposed in the valley. A supporting mechanism supports the exhaust conduit with respect to the internal combustion engine. The supporting mechanism is configured to allow the exhaust conduit to move with respect to the internal combustion engine in 360 degrees in a plane defined by the lateral and transverse axes, and laterally towards and away from the internal combustion engine, thereby facilitating assembly of the exhaust manifold and the internal combustion engine despite positional tolerance differences there between.

20 Claims, 13 Drawing Sheets

Related U.S. Application Data is a continuation of application No. 14/168,572, filed on Jan. 30, 2014, now Pat. No. 9,174,818, which is a continuation-in-part of application No. 13/306,700, filed on Nov. 29, 2011, now Pat. No. 8,668,538.

(51) Int. Cl.
| | | |
|---|---|---|
| *F02B 61/04* | (2006.01) | |
| *F02B 75/22* | (2006.01) | |
| *F01N 13/18* | (2010.01) | |

(56) References Cited

U.S. PATENT DOCUMENTS

| | | |
|---|---|---|
| 2,318,006 A | 5/1943 | Mercier |
| 2,388,924 A | 11/1945 | Mercier |
| 3,768,248 A | 10/1973 | Grgurich et al. |
| 3,898,802 A | 8/1975 | Takokoro et al. |
| 3,994,129 A | 11/1976 | Sakurai et al. |
| 4,082,068 A | 4/1978 | Hale |
| 4,188,784 A | 2/1980 | Hall |
| 4,346,676 A | 8/1982 | Tyner |
| 4,932,367 A | 6/1990 | Newman et al. |
| 4,965,997 A | 10/1990 | Suzuki et al. |
| 5,003,934 A | 4/1991 | Gubon et al. |
| 5,012,648 A | 5/1991 | Okumura |
| 5,337,706 A | 8/1994 | De Blasis |
| 5,346,417 A * | 9/1994 | Isogawa ............... F01N 3/28 440/89 H |
| 5,374,209 A | 12/1994 | Wagner |
| 5,378,180 A | 1/1995 | Nakayama et al. |
| 5,463,990 A | 11/1995 | Rush, II et al. |
| 5,476,402 A | 12/1995 | Nakai et al. |
| 5,494,467 A | 2/1996 | Sohgawa et al. |
| 5,513,606 A | 5/1996 | Shibata |
| 5,553,586 A | 9/1996 | Koishikawa et al. |
| 5,556,311 A | 9/1996 | Fujimoto |
| 5,673,655 A | 10/1997 | Mishima |
| 5,762,051 A | 6/1998 | Okamoto |
| 5,778,833 A | 7/1998 | Kuranishi |
| 5,778,847 A | 7/1998 | Takahashi et al. |
| 5,822,985 A | 10/1998 | Yoshimura |
| 5,822,986 A | 10/1998 | Higashide |
| 5,855,495 A | 1/1999 | Kubo |
| 5,881,553 A | 3/1999 | Steenackers et al. |
| 5,887,907 A | 3/1999 | Kubota et al. |
| 5,893,783 A | 4/1999 | Hiraoka et al. |
| 5,911,605 A | 6/1999 | Wooldridge et al. |
| 5,911,608 A | 6/1999 | Nakayama et al. |
| 6,053,786 A | 4/2000 | Mishima et al. |
| 6,213,074 B1 | 4/2001 | Freese |
| 6,220,605 B1 * | 4/2001 | Becker, Jr. ............. F01N 13/10 277/591 |
| 6,298,815 B1 | 10/2001 | Kashima et al. |
| 6,302,754 B1 | 10/2001 | Kashima |
| 6,338,660 B1 | 1/2002 | Fukuda |
| 6,543,429 B2 | 4/2003 | Osakabe et al. |
| 6,622,481 B1 | 9/2003 | Ruman et al. |
| 6,662,555 B1 | 12/2003 | Ishii |
| 6,722,126 B2 | 4/2004 | Kawamizu |
| 7,043,915 B2 | 5/2006 | Anello |
| 7,115,009 B2 | 10/2006 | Itoh et al. |
| 7,162,985 B2 | 1/2007 | Itoh et al. |
| 7,214,110 B1 | 5/2007 | Ehlers et al. |
| 7,361,067 B1 | 4/2008 | Smedema |
| 7,377,251 B2 | 5/2008 | Wizgall et al. |
| 7,451,734 B2 | 11/2008 | Weber |
| 7,704,111 B2 | 4/2010 | Ito et al. |
| 7,731,241 B2 | 6/2010 | Aoki et al. |
| 7,837,233 B2 | 11/2010 | Johnston et al. |
| 7,867,048 B2 | 1/2011 | Ochiai |
| 7,895,992 B2 | 3/2011 | Diggs et al. |
| 7,930,883 B2 | 4/2011 | Konakawa et al. |
| 7,954,314 B1 | 6/2011 | Bruestle et al. |
| 8,002,597 B2 | 8/2011 | Ochiai |
| 8,266,906 B2 | 9/2012 | Wu et al. |
| 8,366,501 B2 | 2/2013 | Kazuta |
| 8,668,538 B1 | 3/2014 | Langenfeld et al. |
| 8,801,482 B2 | 8/2014 | Ochiai et al. |
| 8,858,283 B2 | 10/2014 | Ochiai et al. |
| 8,978,372 B2 | 3/2015 | Ochiai et al. |
| 9,120,549 B2 | 9/2015 | Ochiai et al. |
| 9,174,818 B1 | 11/2015 | Langenfeld et al. |
| 2002/0017252 A1 | 2/2002 | Onoue |
| 2003/0051683 A1 | 3/2003 | Okamoto |
| 2004/0142612 A1 | 7/2004 | Tawa et al. |
| 2004/0203299 A1 | 10/2004 | Kashima et al. |
| 2005/0263123 A1 | 12/2005 | Itoh et al. |
| 2006/0144369 A1 | 7/2006 | Takahashi et al. |
| 2007/0056281 A1 | 3/2007 | Arvan et al. |
| 2009/0007550 A1 | 1/2009 | Konakawa et al. |
| 2009/0078240 A1 | 3/2009 | Diggs et al. |
| 2009/0094965 A1 | 4/2009 | Takewaki |
| 2009/0215333 A1 | 8/2009 | Ochiai |
| 2010/0130079 A1 | 5/2010 | White et al. |
| 2010/0240269 A1 | 9/2010 | Ochiai |
| 2010/0242450 A1 | 9/2010 | Werni et al. |
| 2011/0223819 A1 | 9/2011 | Kazuta |
| 2013/0130577 A1 | 5/2013 | Ochiai et al. |
| 2013/0210295 A1 | 8/2013 | Davis et al. |

FOREIGN PATENT DOCUMENTS

| | | |
|---|---|---|
| DE | 2344864 | 4/1975 |
| DE | 2449753 | 4/1976 |
| DE | 3150001 | 6/1983 |
| DE | 3631312 | 7/1987 |
| DE | 4030652 | 4/1992 |
| DE | 4042415 | 11/1992 |
| DE | 4136799 | 5/1993 |
| DE | 19736500 | 12/1998 |
| DE | 69823516 | 4/2005 |
| DE | 202005019046 | 3/2006 |
| DE | 102004060845 | 6/2006 |
| DE | 102006043864 | 6/2007 |
| DE | 202008010025 | 11/2008 |
| DE | 102010034953 | 6/2011 |
| DE | 102011001195 | 9/2011 |
| DE | 102010015679 | 10/2011 |
| EP | 0685637 | 12/1999 |
| EP | 1069301 | 1/2001 |
| FR | 651848 | 2/1929 |
| GB | 436058 | 10/1935 |
| GB | 518518 | 2/1940 |
| GB | 674532 | 6/1952 |
| GB | 915230 | 1/1963 |
| JP | 5699005 | 12/1954 |
| JP | 55010043 | 1/1980 |
| JP | 06-146876 | 5/1994 |
| JP | 06146876 | 5/1994 |
| JP | 1994264757 | 9/1994 |
| JP | 1997317464 | 12/1997 |
| JP | 2000356123 | 12/2000 |
| JP | 2001140636 | 5/2001 |
| JP | 200297948 | 4/2002 |
| JP | 2002097948 | 4/2002 |
| JP | 2003286842 | 10/2003 |
| JP | 200460557 | 2/2004 |
| JP | 2004293404 | 10/2004 |
| JP | 2005188351 | 7/2005 |
| JP | 2005188352 | 7/2005 |
| JP | 2006170020 | 6/2006 |
| JP | 2008031868 | 2/2008 |
| JP | 2008031897 | 2/2008 |
| JP | 2008031898 | 2/2008 |
| JP | 2009002265 | 1/2009 |
| JP | 4329396 | 9/2009 |
| JP | 2010242744 | 10/2010 |
| JP | 2011190704 | 9/2011 |
| JP | 2011202578 | 10/2011 |
| WO | 1989004421 | 5/1989 |

\* cited by examiner

OUTBOARD MOTORS AND EXHAUST SYSTEMS FOR OUTBOARD MOTORS HAVING AN EXHAUST CONDUIT SUPPORTED INSIDE THE V-SHAPE

CROSS REFERENCE TO RELATED APPLICATION

This application is a continuation-in-part of U.S. patent application Ser. No. 14/923,965, filed Oct. 27, 2015, which '965 application is a continuation of U.S. patent application Ser. No. 14/168,572, filed Jan. 30, 2014, now U.S. Pat. No. 9,174,818, which '572 application is a continuation-in-part of U.S. patent application Ser. No. 13/306,700, filed Nov. 29, 2011, now U.S. Pat. No. 8,668,538, which are incorporated herein by reference in entirety.

FIELD

The present disclosure relates to marine engines and exhaust systems for marine engines, and particularly to V-style internal combustion engines having an exhaust conduit located in the V-shape.

BACKGROUND

The following U.S. Patents are incorporated herein by reference:

U.S. Pat. No. 8,668,538 discloses a marine engine having an exhaust system comprising a cylinder block comprising first and second banks of cylinders that are disposed along a longitudinal axis and that extend transversely with respect to each other in a V-shape so as to define a valley there between. A catalyst receptacle is disposed in the valley and contains at least one catalyst that treats exhaust gas from the marine engine. An exhaust manifold conveys exhaust gas from the marine engine to the catalyst receptacle. The exhaust manifold has a first port receiving exhaust gas from the first bank of cylinders, a second port receiving exhaust gas from the second bank of cylinders, and a conduit conveying the exhaust gas from the first and second ports to the catalyst receptacle, wherein from the first and second ports to the catalyst receptacle, the conduit only reverses direction once with respect to the longitudinal axis.

U.S. Pat. No. 9,174,818 discloses a marine engine having a cylinder block with first and second banks of cylinders that are disposed along a longitudinal axis and extend transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter. Various other features, objects, and advantages of the invention will be made apparent from the following description taken together with the drawings.

In the illustrated examples, an outboard motor comprises an internal combustion engine that longitudinally extends with respect to a longitudinal axis, laterally extends with respect to a lateral axis that is perpendicular to the longitudinal axis, and transversely extends with respect to a transverse axis that is perpendicular to the longitudinal axis and perpendicular to the lateral axis. The internal combustion engine comprises a cylinder block having first and second banks of cylinders that are disposed along the longitudinal axis. The first and second banks of cylinders extend transversely with respect to each other in a V-shape so as to define a valley there between. An exhaust manifold conveys exhaust gas from the internal combustion engine. The exhaust manifold comprises a first inlet port that receives the exhaust gas from the first bank of cylinders, a second inlet port that receives the exhaust gas from the second bank of cylinders, and an exhaust conduit that merges and longitudinally conveys the exhaust gas from the first and second inlet ports. The exhaust conduit is at least partially disposed in the valley. A supporting mechanism supports the exhaust conduit with respect to the internal combustion engine. The supporting mechanism is configured to allow the exhaust conduit to move laterally towards and away from the internal combustion engine, and 360 degrees in a plane defined by the lateral and transverse axes, thereby facilitating assembly of the exhaust manifold and the internal combustion engine despite positional tolerance differences there between.

PRIOR DISCLOSURE

Figure 1:
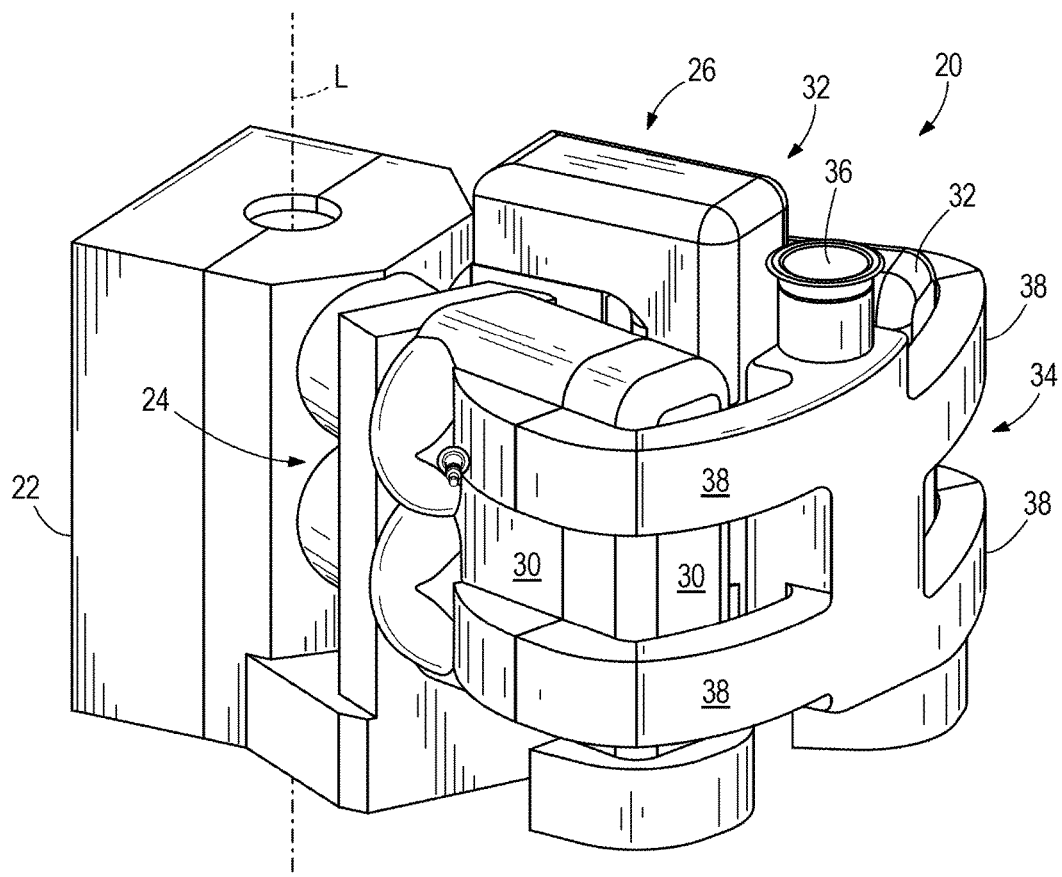
FIGS. 1-15 are taken from U.S. patent application Ser. No. 14/923,965, which is incorporated herein by reference.

FIG. 1 is a perspective view of a four-cylinder, four-stroke, V-style internal combustion engine for a marine drive.

Figure 2:
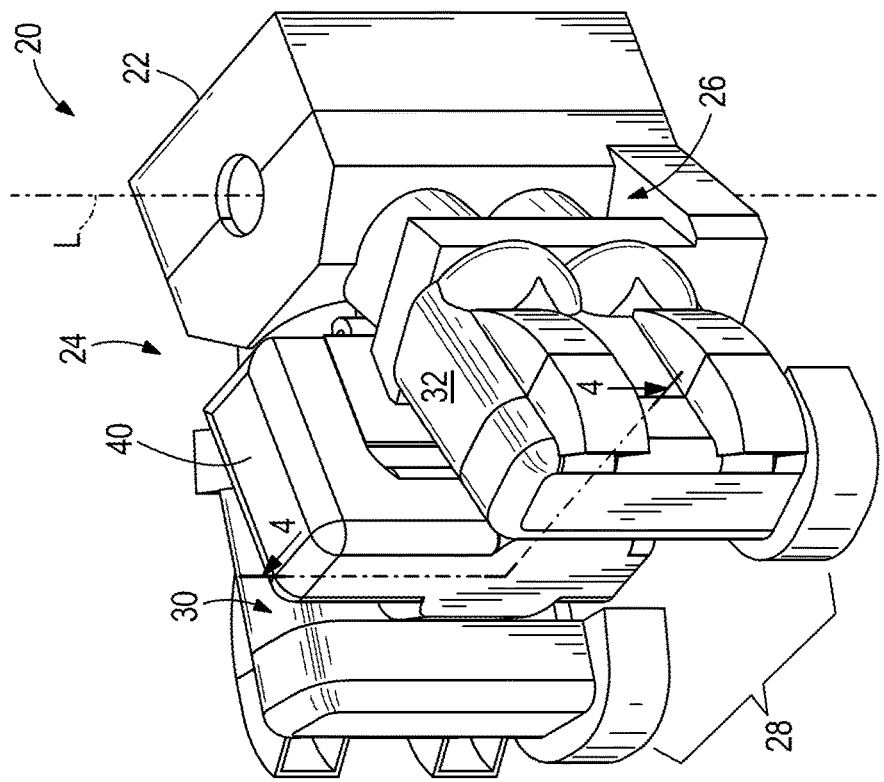

FIG. 2 is a view like FIG. 1, wherein the intake manifold of the engine is removed.

Figure 3:
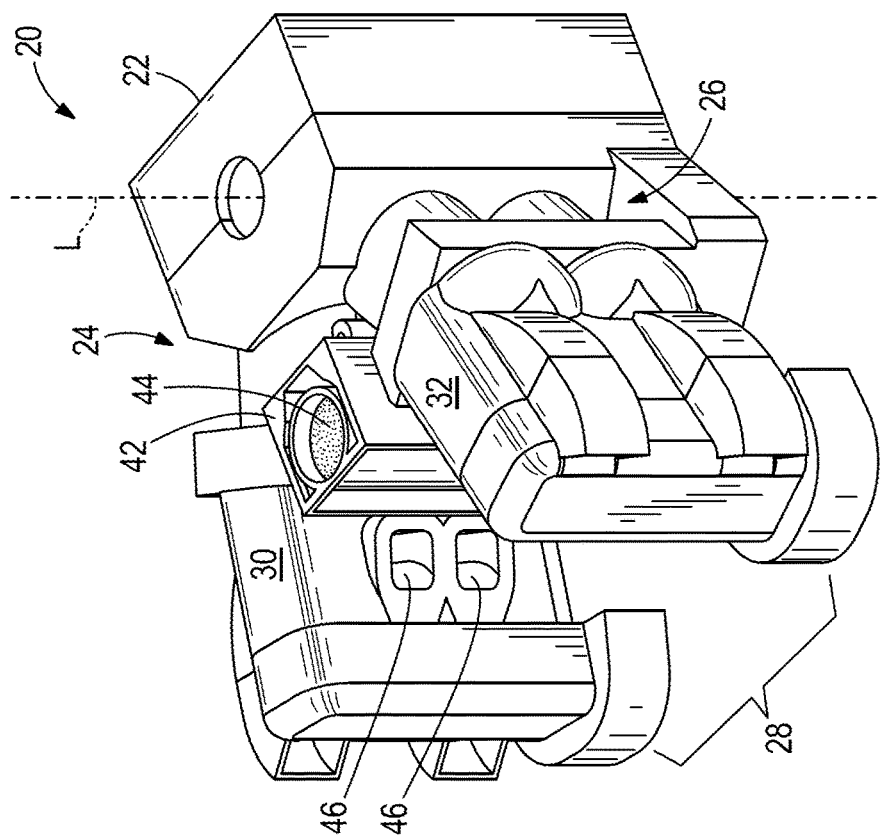

FIG. 3 is a view like FIG. 2, wherein the exhaust manifold is removed and showing a catalyst receptacle disposed in the valley defined by the cylinders of the engine.

Figure 4:
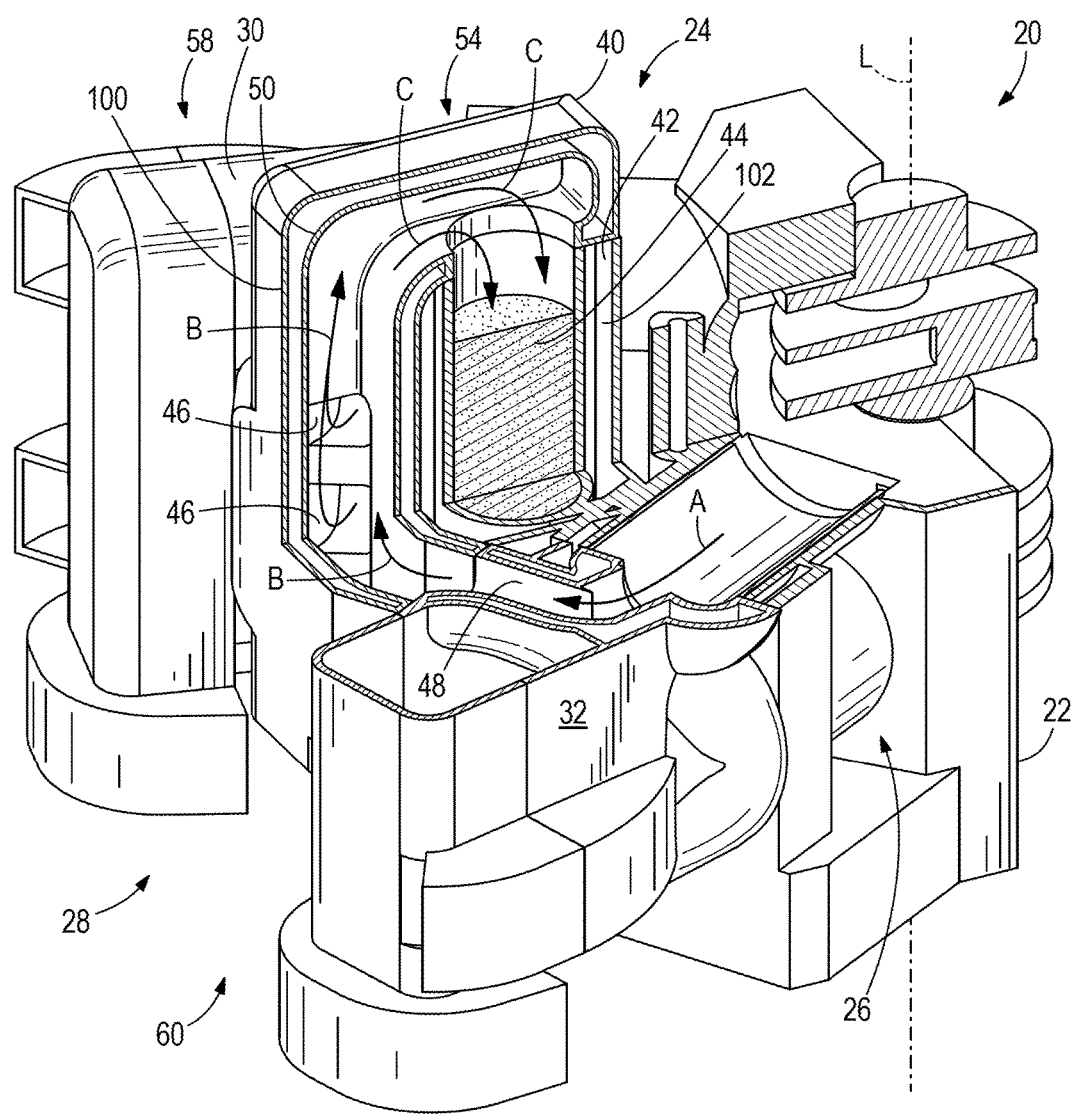

FIG. 4 is a view of section 4-4 taken in FIG. 2.

Figures 5, 6:
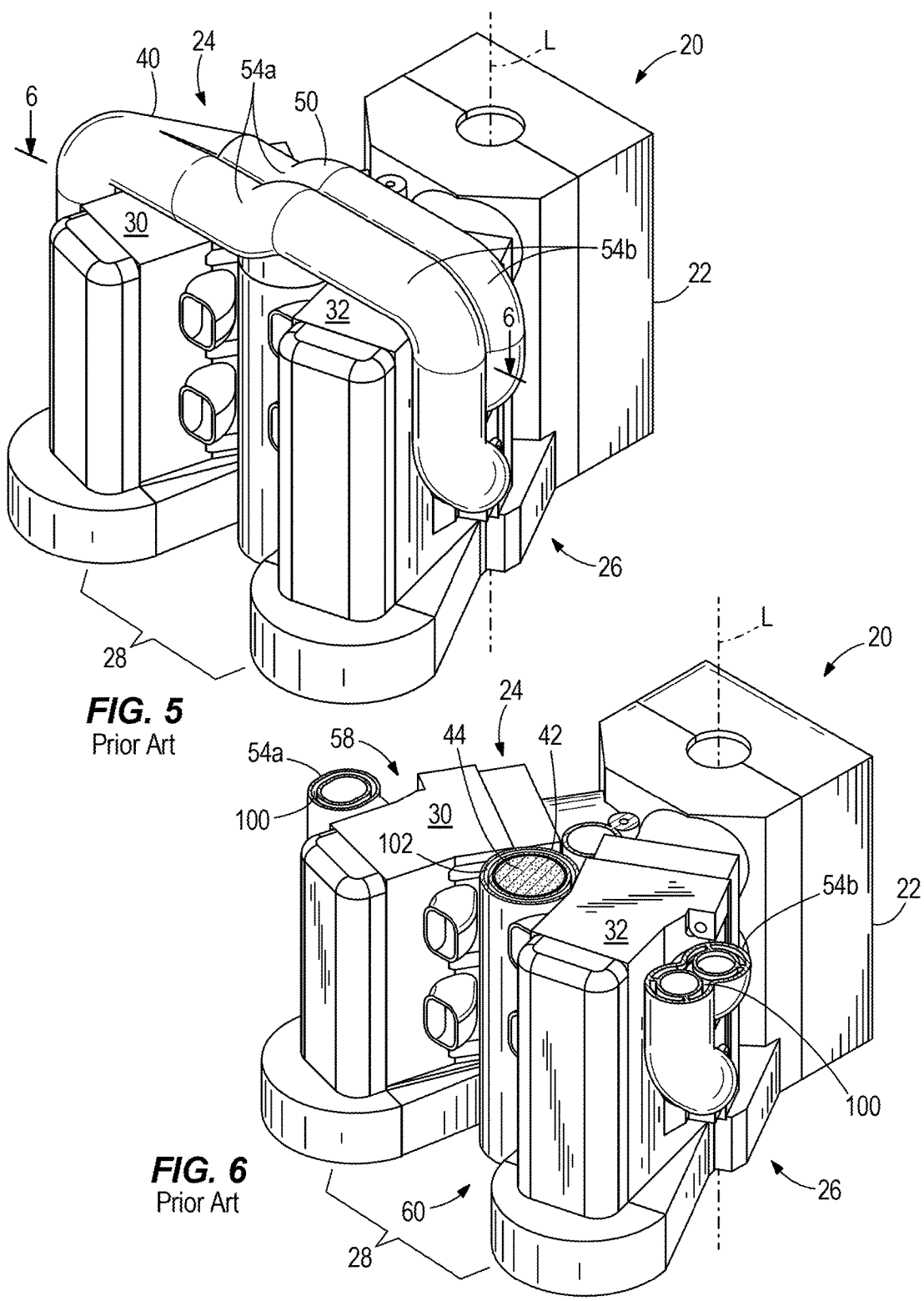

FIG. 5 is a perspective view of another example of a four-cylinder, four-stroke, V-style internal combustion engine for a marine drive.

FIG. 6 is a view like FIG. 5, showing a catalyst receptacle disposed in the valley defined by the cylinders of the engine.

Figure 7:
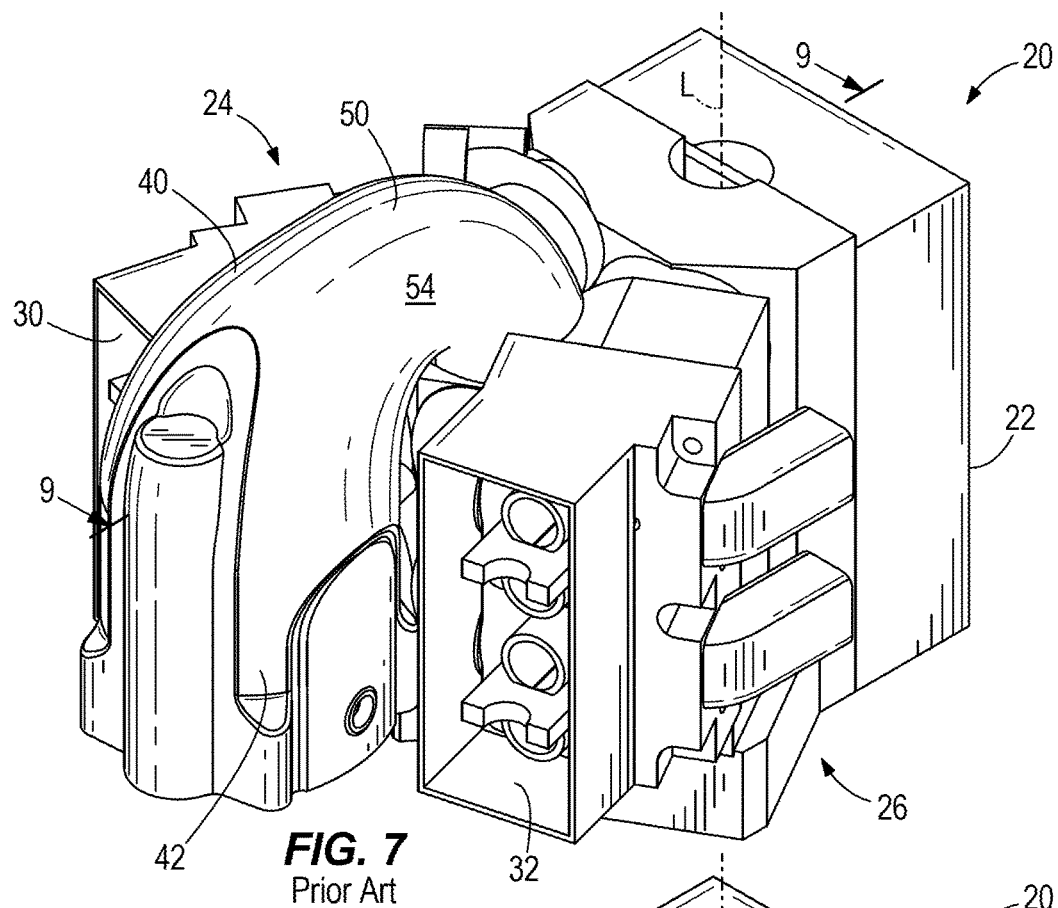

FIG. 7 is a perspective view of another example of a four-cylinder, four-stroke, V-style internal combustion engine for a marine drive.

Figure 8:
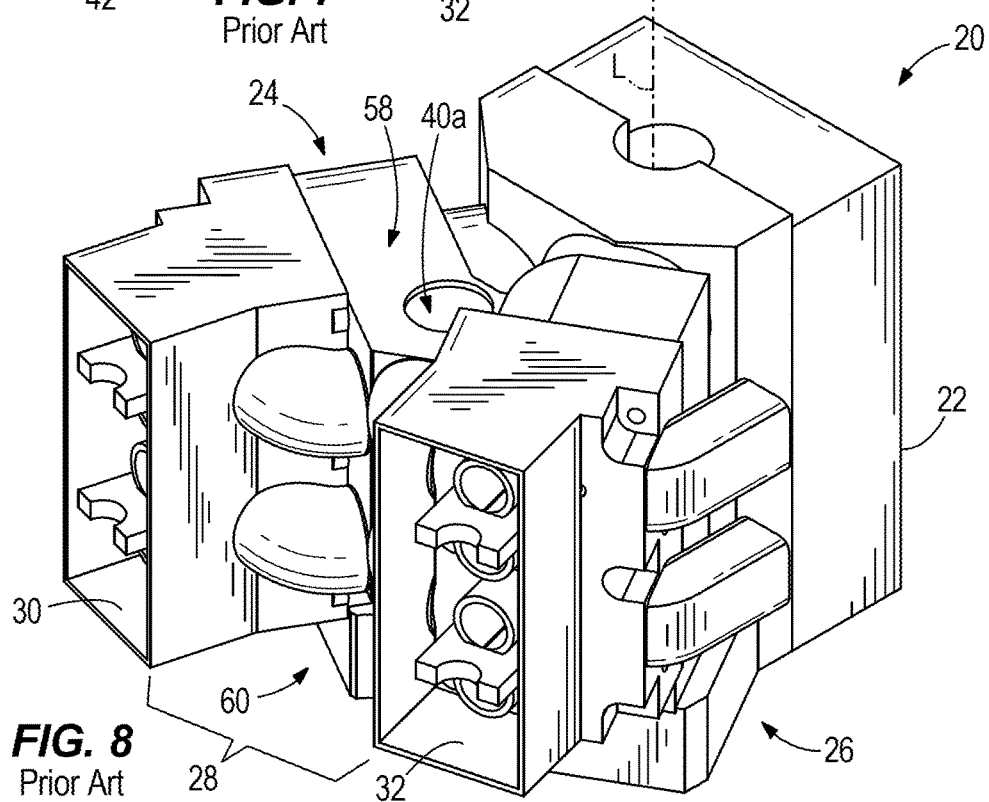

FIG. 8 is a view like FIG. 7, showing a catalyst receptacle disposed in the valley defined by the cylinders of the engine.

Figure 9:
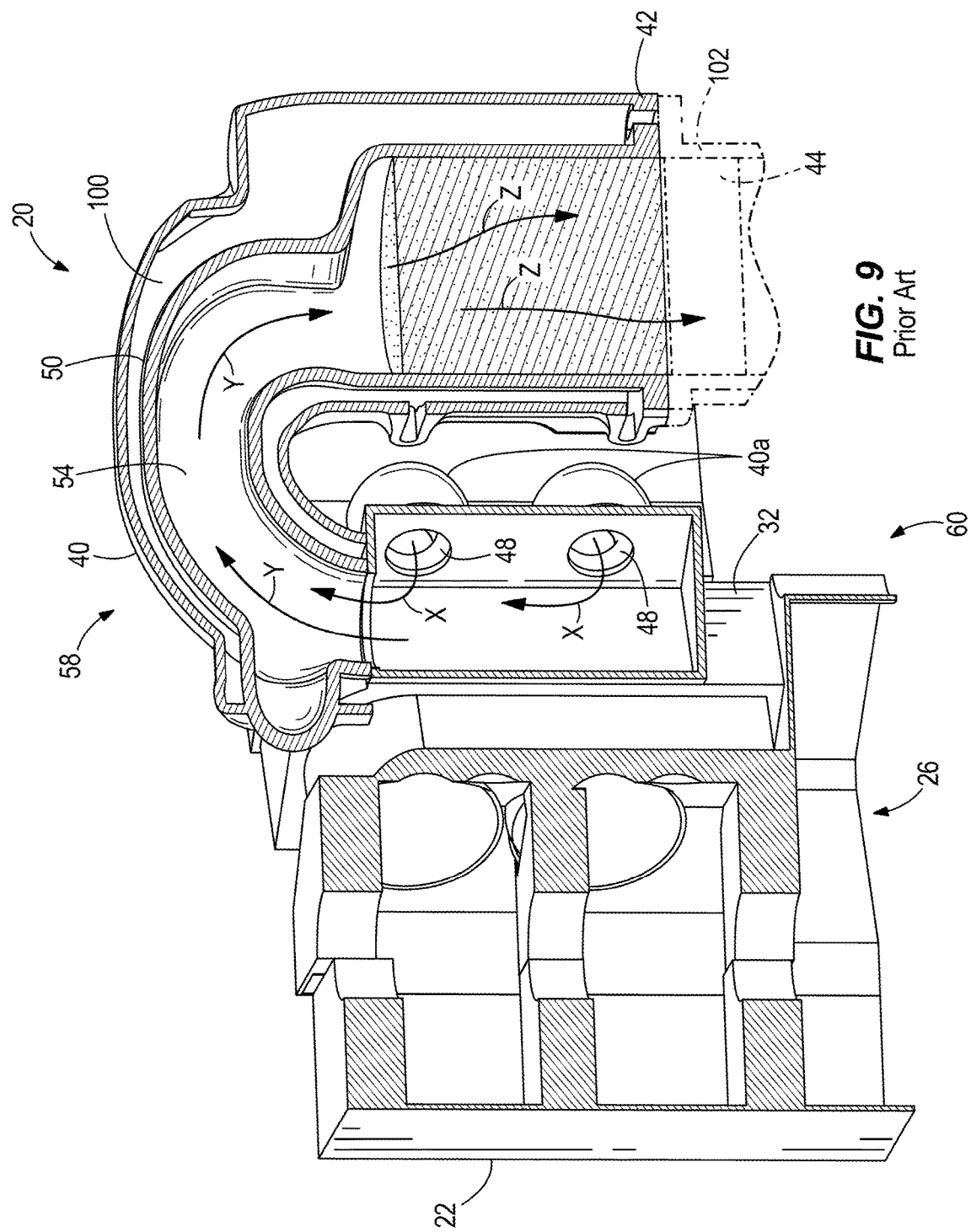

FIG. 9 is a view of section 9-9 taken in FIG. 7.

Figure 10:
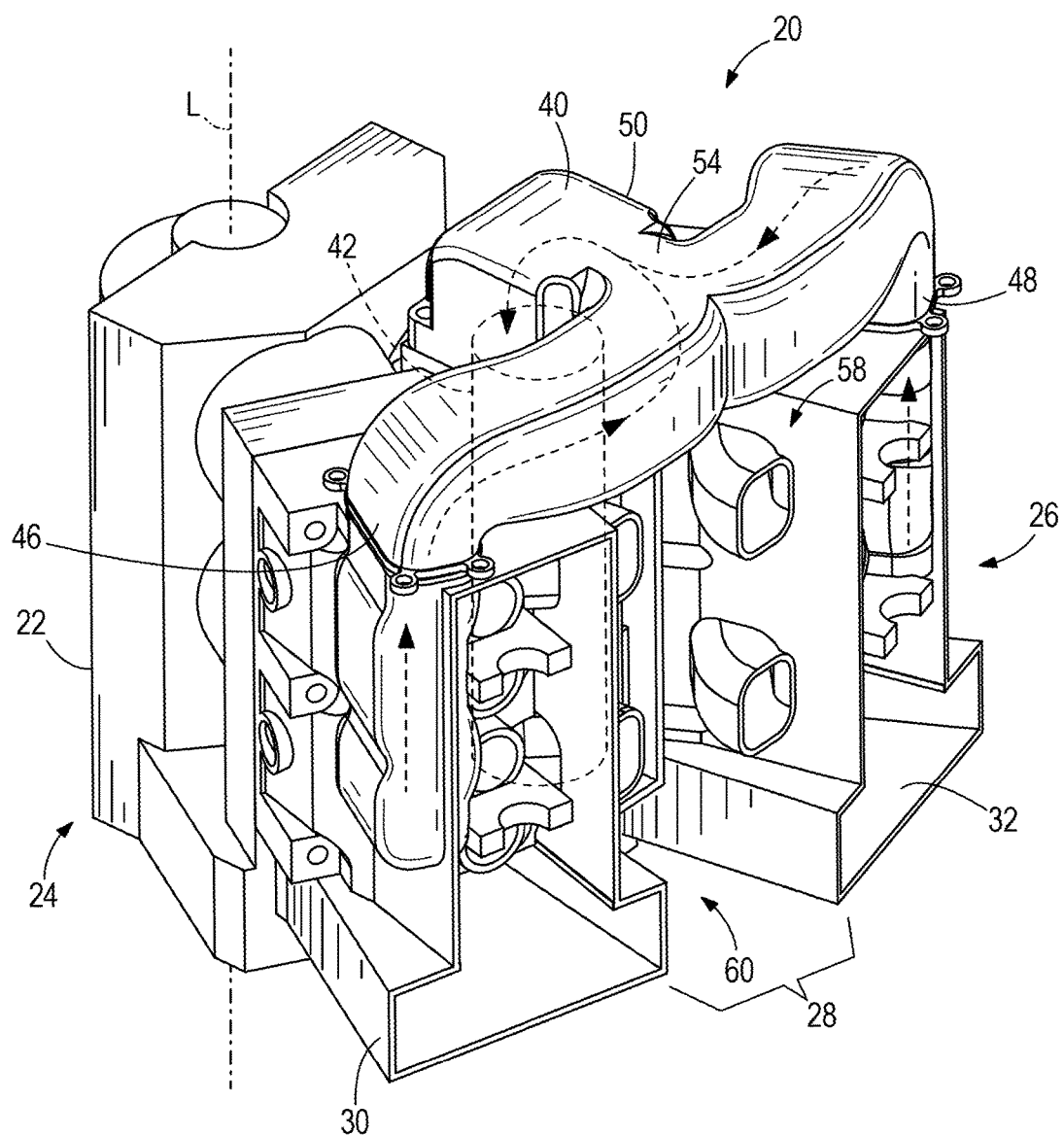

FIG. 10 is a perspective view of another example of a four-cylinder, four-stroke, V-style internal combustion engine for a marine drive.

Figure 11:
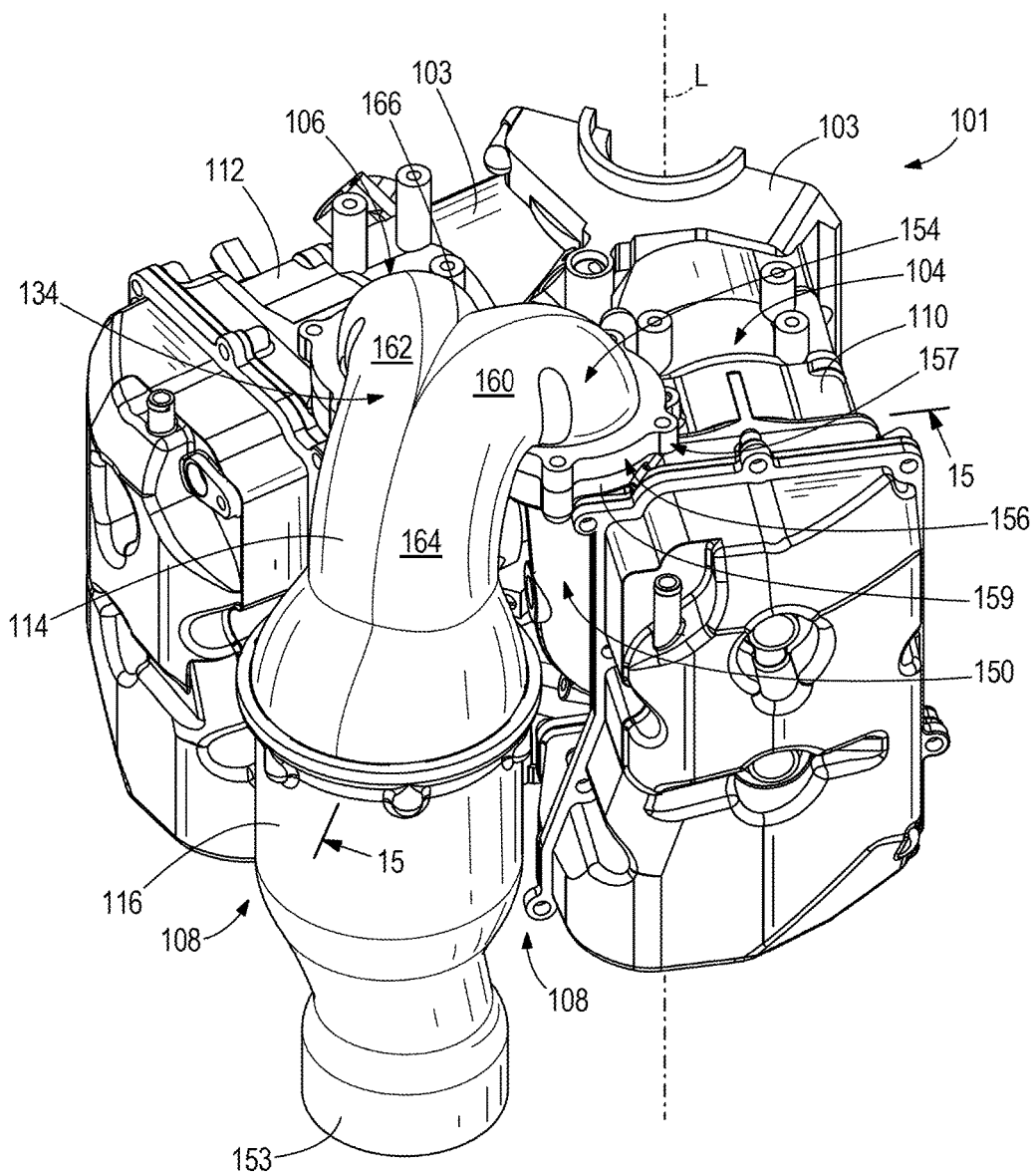

FIG. 11 is a perspective view of another example of a V-style internal combustion engine for a marine drive.

Figure 12:
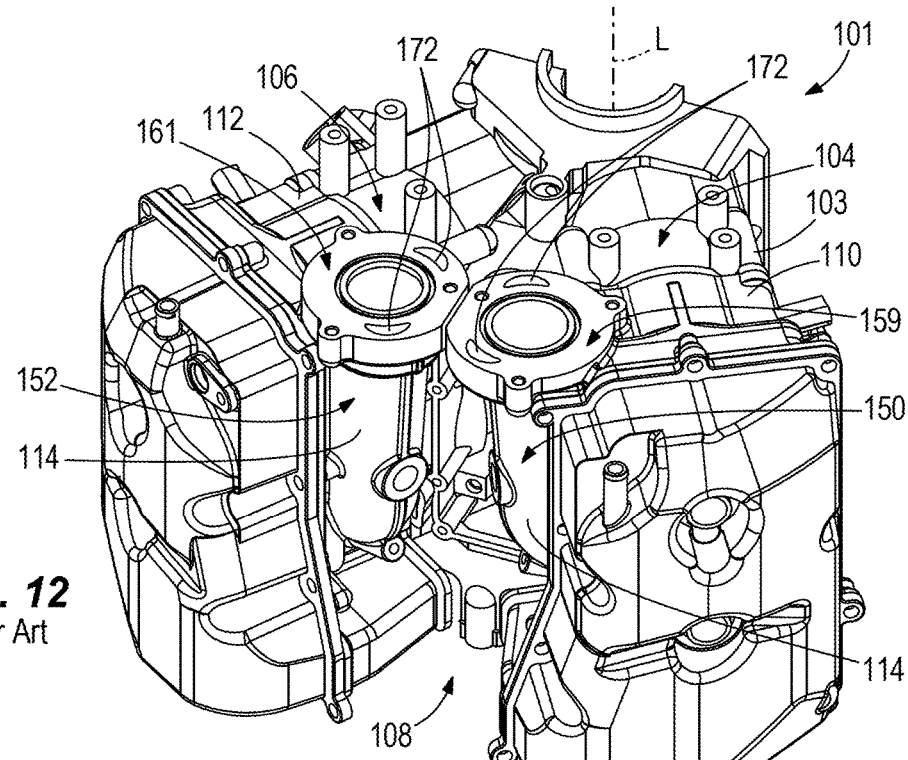

FIG. 12 is a view like FIG. 11, having an exhaust manifold removed therefrom.

Figure 13:
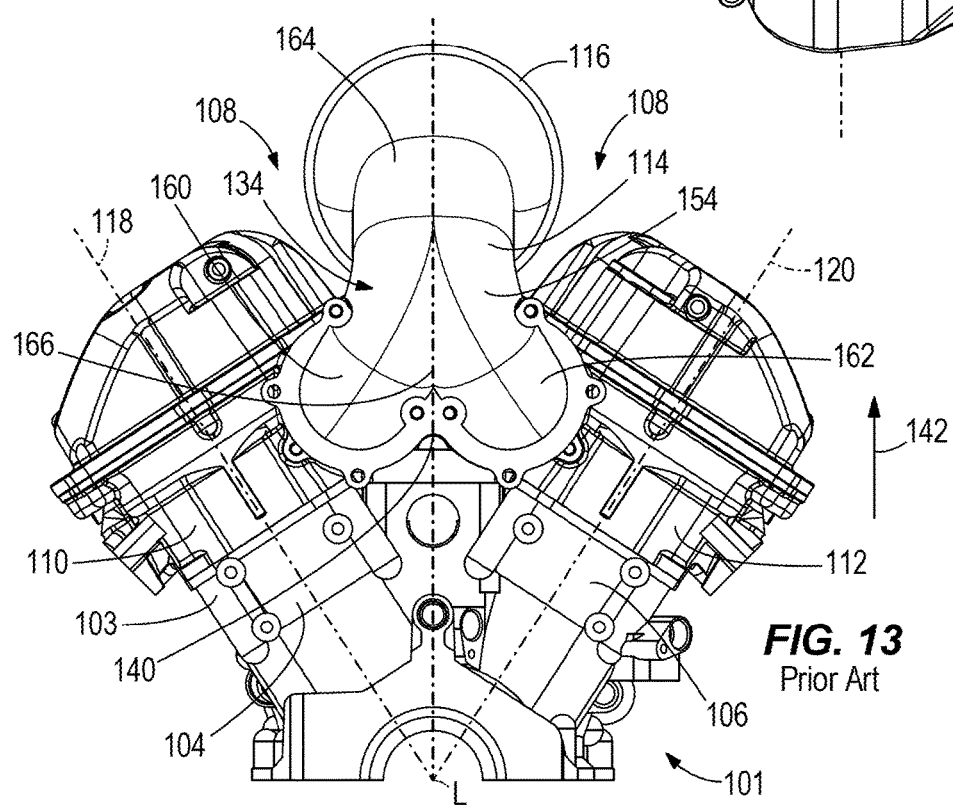

FIG. 13 is a top view of the example shown in FIG. 11.

Figure 14:
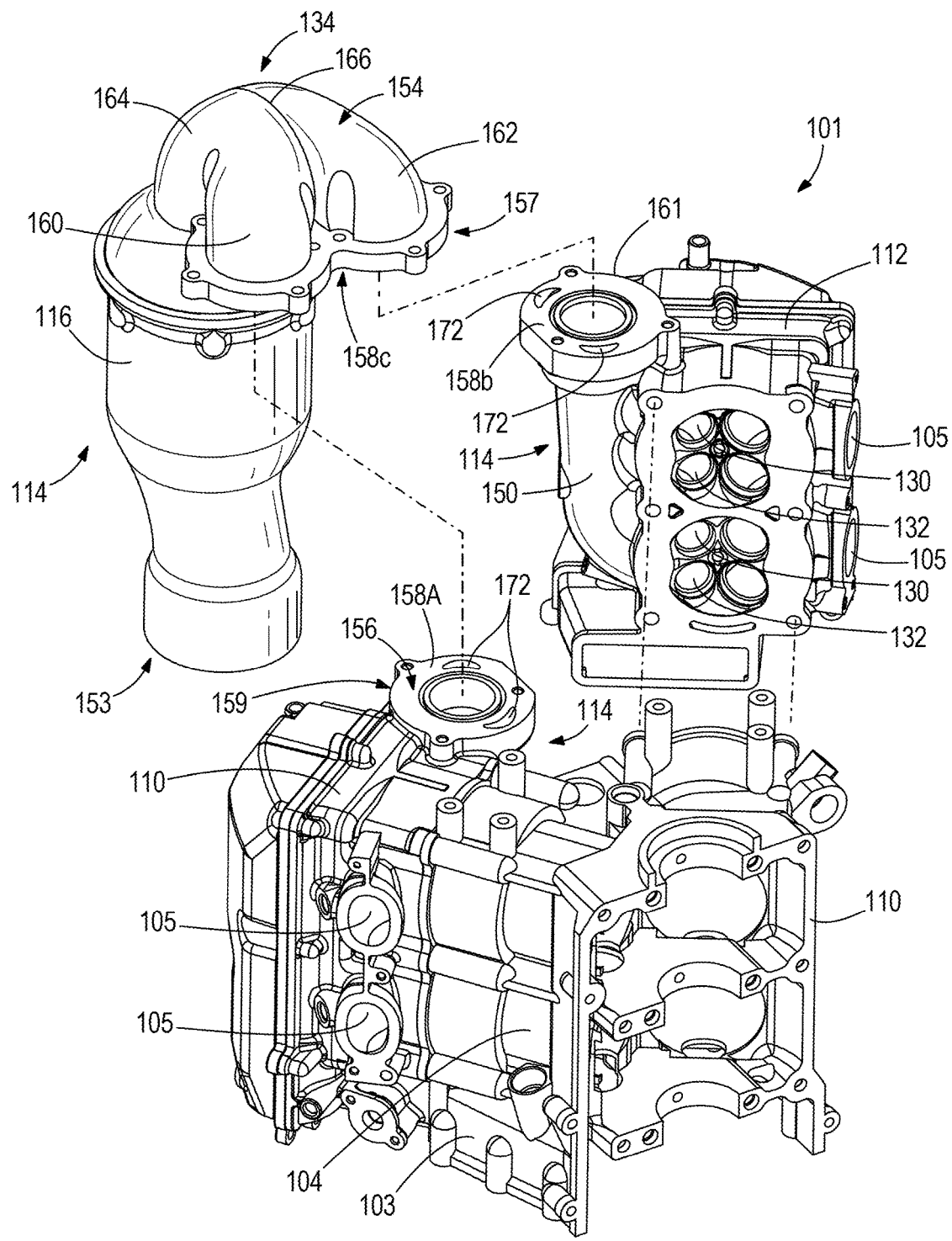

FIG. 14 is an exploded view of the embodiment shown in FIG. 11.

Figure 15:
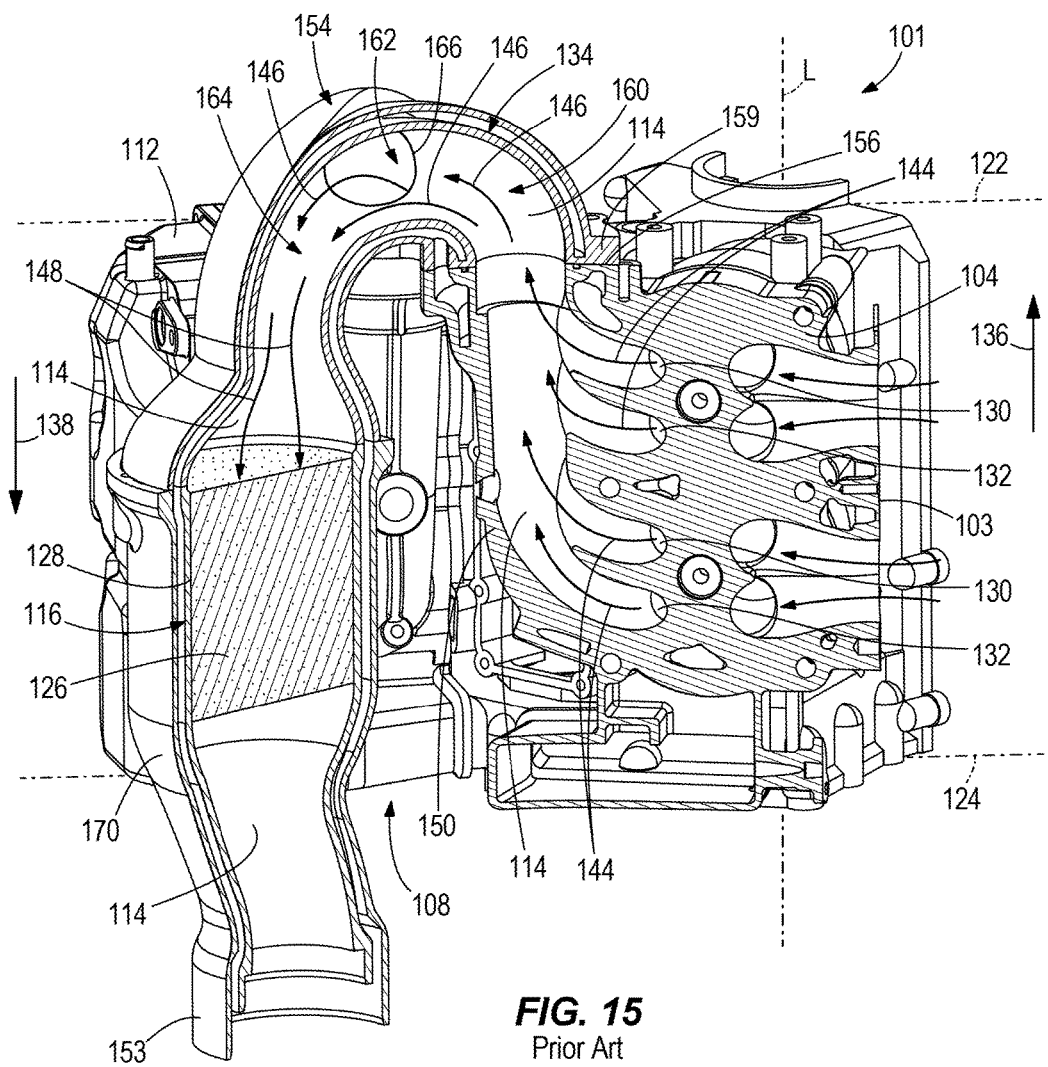

FIG. 15 is a view of section 15-15, taken in FIG. 11.

PRESENT DISCLOSURE

Figure 16:
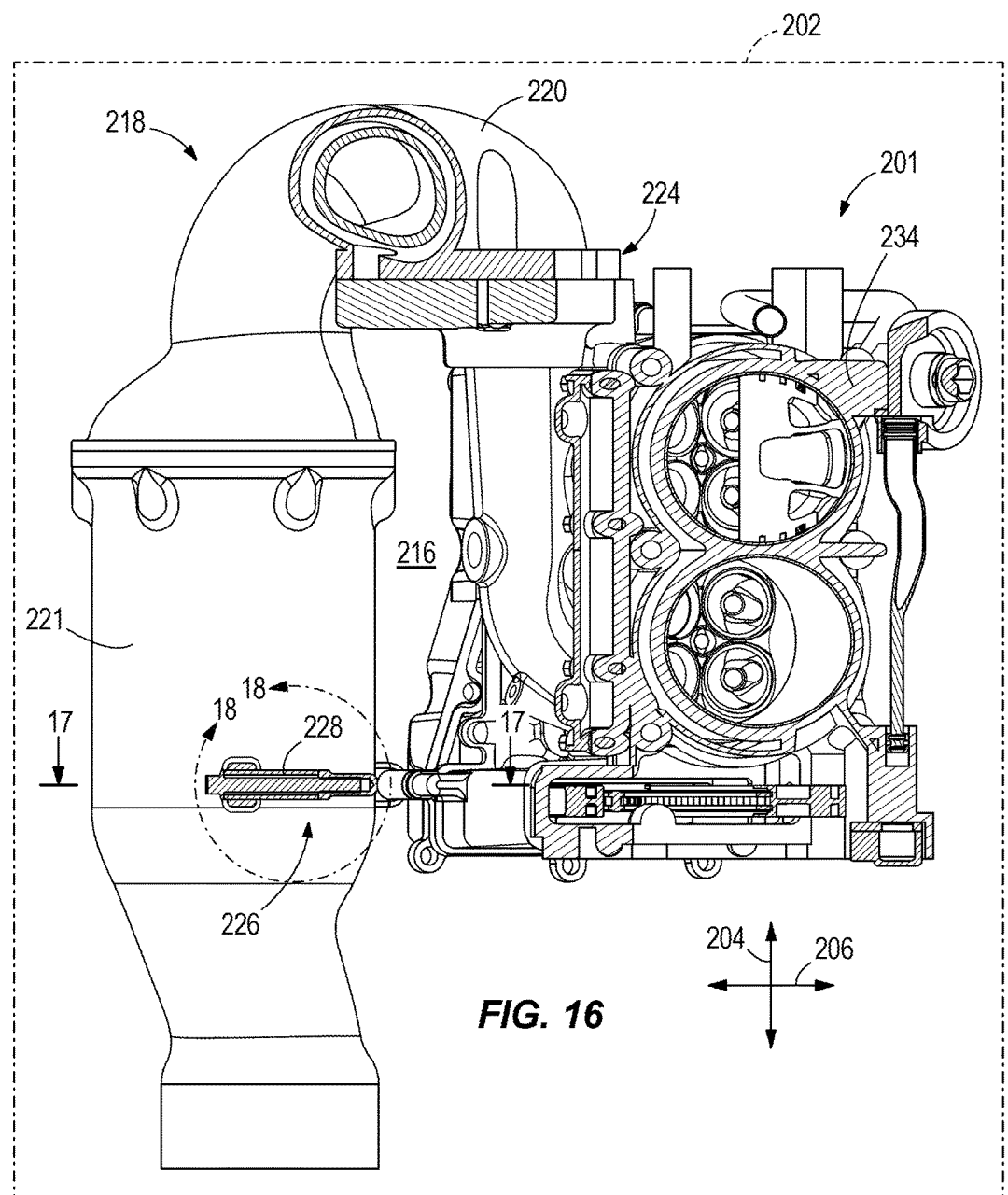
FIGS. 16-18 are new.

FIG. 16 is a perspective view, partially cut away, of another example of a V-style internal combustion engine for a marine drive.

Figure 17:
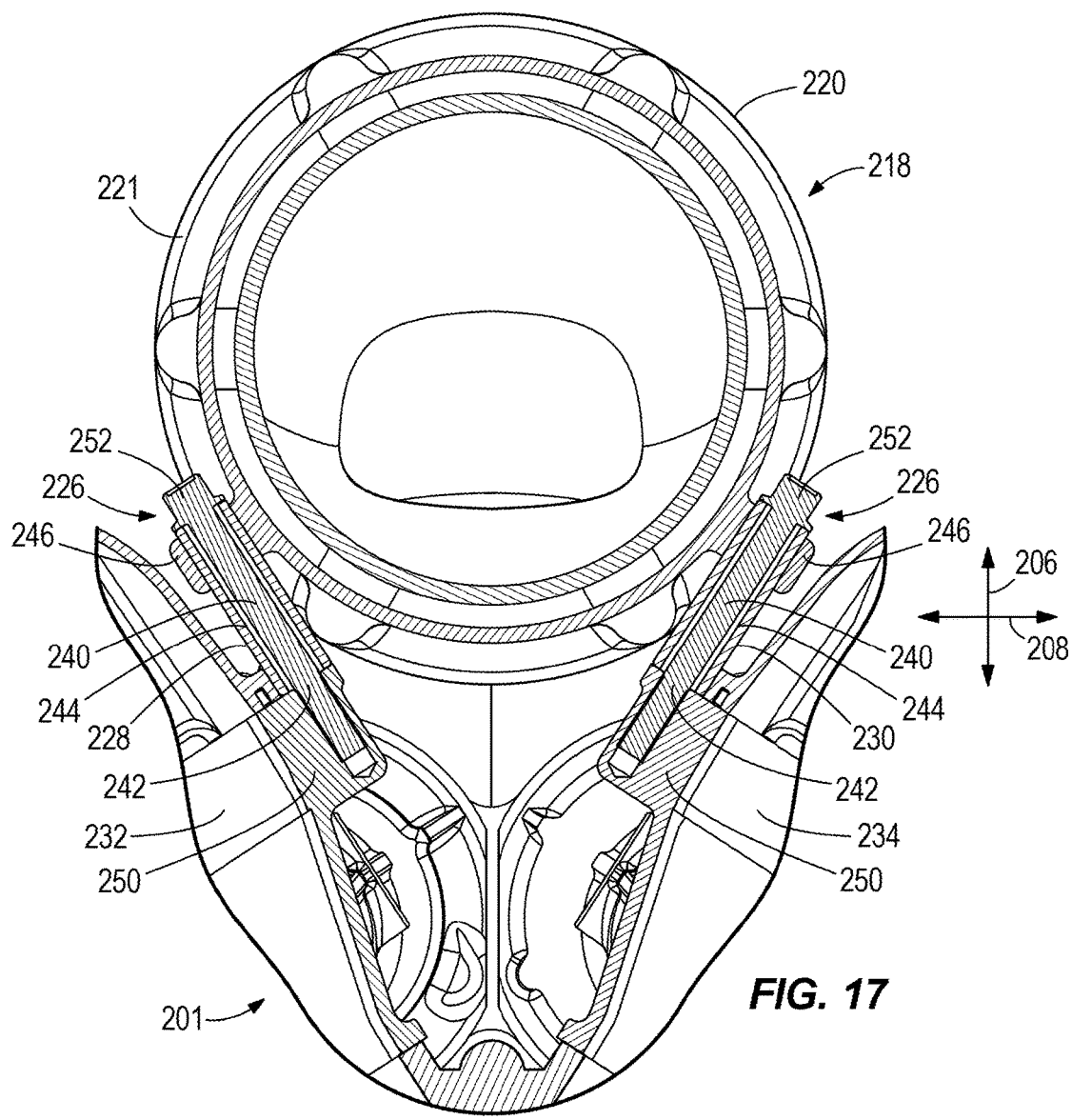
Figure 18:
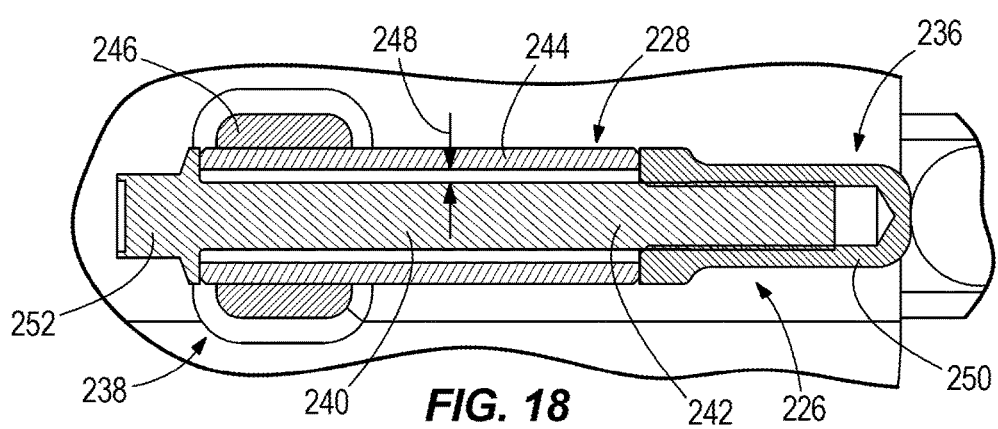

FIG. 17 is a view of Section 17-17, taken in FIG. 16.
FIG. 18 is a view of Section 18-18, taken in FIG. 16.

DETAILED DESCRIPTION OF THE DRAWINGS

In the present disclosure, certain terms have been used for brevity, clearness and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. Each limitation in the appended claims is intended to invoke interpretation under 35 U.S.C. § 112, sixth paragraph only if the terms "means for" or "step for" are explicitly recited in the respective limitation.

The following description and related drawings under "Prior Disclosure" are taken nearly verbatim from the incorporated U.S. patent application Ser. No. 14/923,965.

PRIOR DISCLOSURE

FIG. 1 depicts a marine engine 20, which in the example shown is a four-cylinder, four-stroke, V-style engine for an outboard motor. It should be noted however that while the examples that are shown and described herein are four-cylinder, four-stroke, V-style marine engines, the concepts of the prior disclosure are also fully applicable to marine engines having any number of cylinders, including but not limited to six and eight cylinder V-style marine engines in outboard, inboard and inboard/outboard marine engine configurations. In FIG. 1, the marine engine 20 includes a cylinder block 22 on which first and second banks of aligned cylinders 24, 26 are aligned with respect to a longitudinal axis L and extend transversely with respect to each other in a V-shape so as to define a valley 28 (see FIGS. 2 and 3) there between. First and second cylinder heads 30, 32 are located on the first and second banks of aligned cylinders 24, 26, respectfully. An intake manifold 34 is also shown in FIG. 1. The intake manifold 34 receives intake air via inlet port 36 and conveys the intake air to the respective first and second banks of aligned cylinders 24, 26 for the combustion process. In the example shown, an intake air passageway 38 is provided for each cylinder in the first and second banks of aligned cylinders 24, 26. Other configurations of the intake manifold 34 can be employed and the example shown is not intended to be limiting on the prior disclosure. As is conventional, intake air supplied via the intake manifold 34 is utilized during the combustion process in the marine engine 20.

FIGS. 2 and 3 depict the marine engine 20 without the intake manifold 34. An exhaust manifold 40 conveys exhaust gas from the first and second cylinder heads 30, 32 to a catalyst receptacle 42 disposed in the valley 28. In this example, the exhaust manifold 40 is disposed in the valley 28 and receives exhaust gas from the first and second banks of aligned cylinders 24, 26 via the first and second cylinder heads 30, 32. FIG. 3 depicts the marine engine 20 having the exhaust manifold 40 removed and shows the catalyst receptacle 42 containing at least one catalyst 44 that treats exhaust gas from the first and second banks of aligned cylinders 24, 26. The catalyst receptacle 42 has an inner cylindrical shape; however other shapes and sizes of catalyst receptacles can be employed. Optionally, the catalyst receptacle 42 can be cast in to the cylinder block 22.

FIG. 4 depicts the marine engine 20 at section 4-4 taken in FIG. 2. The exhaust manifold 40 has first ports 46 receiving exhaust gas from the first cylinder head 30, second ports 48 receiving exhaust gas from the second cylinder head 32, and a conduit 50 conveying the exhaust gas from the first and second ports 46, 48 to the catalyst receptacle 42. The number of ports can vary from that which is shown and described. In the example shown, ports 46, 48 are provided for each cylinder in the first and second banks of aligned cylinders 24, 26, respectively. FIG. 4 shows two ports 46 and one port 48. In this example, a second port 48, which is not shown in this view, is also provided for the second bank of aligned cylinders 26. The first ports 46 and second ports 48 are inwardly oriented towards the valley 28 and the exhaust manifold 40 is configured to receive and mix exhaust gas from both of the first and second ports 46, 48 in the conduit 50. In this configuration, the exhaust manifold 40 extends out from the end of the valley 28 and then back into the valley 28 at a bend 54, which in the example shown is a 180-degree bend. Exhaust gas is conveyed through the bend 54 to the catalyst receptacle 42 wherein the exhaust gas is treated by catalyst 44. In this configuration, from the first and second ports 46, 48, the conduit 50 only reverses direction once with respect to the longitudinal axis L, which reversal is provided by the 180-degree bend 54.

As can be seen from FIG. 4, the valley 28 has first and second opposite (in this example, top and bottom) ends 58, 60. In this example, the exhaust manifold 40 extends out from and back into only one of the first and second ends 58, 60, namely the first end 58 in this example. Exhaust gas thus flows transversely at arrows A from the first and second banks of aligned cylinders 24, 26 through the first and second ports 46, 48. Once into the exhaust manifold 40, exhaust gas flows transversely with respect to the first and second ports 46, 48 (longitudinally to the engine), out of the first end 58 of the valley 28 and through the conduit 50 at arrow B. Once reversing direction through the bend 54 at arrow C, exhaust gas flows back into the first end 58 of the valley 28 and into the catalyst receptacle 42 for treatment by the catalyst 44. After flowing through the catalyst 44, exhaust gas exits the catalyst receptacle 42 via the second end 60 of the valley 28 for disposal from the propulsion system via conventional means.

A cooling jacket 100 can be provided around the exhaust manifold 40. Cooling fluid (not shown), such as water drawn from the body of water in which the vessel is operating can be pumped through the cooling jacket in a conventional manner to maintain the exhaust manifold at a preferred temperature. A cooling jacket 102 can also be provided on the catalyst receptacle 42 to maintain the catalyst and/or catalyst receptacle at a preferred temperature.

The exhaust system shown in FIGS. 1-4 has been found by the inventors to provide significant packaging and cost advantages and provides an arrangement that meets space constraints and minimizes weight. By routing the exhaust gas through only a single bend 54 in the exhaust manifold 40 pressure drop is decreased and thus efficiency of the marine engine 20 is advantageously increased.

FIGS. 5 and 6 depict another example of the marine engine 20 having like reference numbers applied to like structures of the examples of FIGS. 1-4. In FIGS. 5 and 6, the ports 46, 48 are outwardly oriented with respect to the valley 28. In this example, the conduit 50 has opposing 180-degree bends 54a extending inwardly from the first ports 46 to the catalyst receptacle 42 and opposing 180-degree bends 54b extending inwardly from the second ports 48 to the catalyst receptacle 42. Thus, the exhaust manifold 40 extends inwardly from the outwardly oriented first and second ports 46, 48 into only one of the first and second ends 58, 60 of the valley 28 (in this case the first end 58). As such, the exhaust gas flows transversely from the outwardly oriented first and second ports 46, 48, through the conduits 50, reversing direction with respect to the longitudinal axis through the opposing 180-degree bends 54a, 54b and then into the first end 58 of the valley 28 to the catalyst receptacle 42, wherein the exhaust gas is treated by the catalyst 44. Again, by routing the exhaust gas through only a single 180-degree bend in the exhaust manifold 40 (i.e. bends 54a and 54b for each respective port 46, 48), the exhaust gas only reverses direction once with respect to the longitudinal axis and pressure drop is decreased and thus efficiency of the marine engine 20 is advantageously increased.

FIGS. 7-9 depict a marine engine 20 similar to the examples shown herein above, and having like reference numbers applied to similar structures. In FIGS. 7-9, the exhaust manifold 40 is located at the center of the valley 28 and has a portion 40a that is cast into the cylinder block 22. In this example, exhaust gas flows transversely from the first and second ports 46, 48, as shown in FIG. 9 at arrow X, through conduit 50 and reverses direction with respect to the longitudinal axis through the 180-degree bend 54, as shown at arrow Y, and then into the catalyst receptacle 42 located in the valley 28, as shown at arrow Z. The conduit 50 only reverses direction once with respect to the longitudinal axis L.

FIG. 10 depicts a marine engine 20 similar to the examples shown herein above, and having like reference numbers applied to similar structures. In FIG. 10, the first and second ports 46, 48 include single ports 46, 48 located at one end of the first and second cylinder heads 30, 32. The catalyst receptacle 42 is cast into the cylinder block 22. Again, the conduit 50 only reverses direction once with respect to the longitudinal axis L.

The prior disclosure thus provides a marine engine 20 having an exhaust system that comprises a catalyst receptacle 42 disposed in a valley 28 formed by the V-shape of first and second banks of aligned cylinders 24, 26. The catalyst receptacle 42 contains a catalyst 44 that treats exhaust gas from the first and second banks of aligned cylinders 24, 26. An exhaust manifold 40 conveys exhaust gas from first and second cylinder heads 30, 32 to the catalyst receptacle 42. The exhaust manifold 40 has a first port 46 receiving exhaust gas from the first cylinder head 30, a second port 48 receiving exhaust gas from the second cylinder head 32, and a conduit 50 conveying the exhaust gas from the first and second ports 46, 48 to the catalyst receptacle 42. Exhaust gas thus flows from the first and second cylinder heads 30, 32 and transversely through the first and second ports 46, 48. Once into the exhaust manifold 40, exhaust gas flows transversely with respect to the first and second ports 46, 48, out of the valley 28, and through the conduit 50. Exhaust gas flows back into the first end 58 of the valley 28 and into the catalyst receptacle 42 for treatment by the catalyst 44.

FIGS. 11-15 depict another example of a marine engine 101, which in the example shown is a four-cylinder, four-stroke, V-style engine for an outboard motor. As with the previous examples, it should be noted that the concepts of this embodiment are also fully applicable to engines having any number of cylinders, including but not limited to six and eight cylinder V-style marine engines in outboard, inboard and inboard/outboard marine engine configurations. In FIGS. 11-15, the marine engine 101 includes a cylinder block 103 on which first and second banks of cylinders 104, 106 are aligned with respect to a longitudinal axis L. The first and second banks of cylinders 104, 106 extend transversely with respect to each other in a V-shape so as to define a valley 108 (e.g. see FIG. 13) there between. As shown in FIG. 13, the valley 108 is defined between the center lines 118, 120 of the respective first and second banks of cylinders 104, 106. As shown, in FIG. 15, the valley 108 has a top end designated at 122 along an uppermost end of the cylinder block 103 and a bottom end 124 along a lowermost end of the cylinder block 103. First and second cylinder heads 110, 112 are located on the first and second banks of cylinders 104, 106, respectively.

A conduit 114 conveys exhaust gas from the first and second banks of cylinders 104, 106 to a catalyst receptacle 116 disposed in the valley 108. The conduit 114 can be formed of one or more than one components connected together in series and can extend from the first and second banks of cylinders 104, 106 to the catalyst receptacle 116 and optionally beyond the catalyst receptacle 116 to an outlet 153 for discharging exhaust gas to an outboard motor housing component and/or outside the outboard motor. The conduit 114 can form part of or all of the catalyst receptacle 116. As explained further herein below, optionally, portions of the conduit 114 can be cast with the cylinder block 103. Other portions of the conduit 114 can be formed separately from the cylinder block and attached thereto. The catalyst receptacle 116 contains a catalyst 126 that treats exhaust gas from the first and second banks of cylinders 104, 106. The catalyst receptacle 116 has a cylindrical inner perimeter 128; however other shapes and sizes of catalyst receptacles can be employed.

An intake manifold (not shown) receives and conveys intake air via intake ports 105 (see FIG. 14) to the respective first and second banks of cylinders 104, 106 for the combustion process. In this example, respective pairs of the intake ports 105 are located outside of the valley 108, on opposite sides of the first and second banks of cylinders 104, 106. Various configurations of the intake manifold can be employed, one example of which is the intake manifold 34 shown in FIG. 1 and described herein above. As is conventional, intake air supplied via the noted intake manifold is utilized during the combustion process in the marine engine 101.

Referring to FIGS. 14 and 15, the conduit 114 receives exhaust gas from each of the first and second banks of cylinders 104, 106 via first and second ports 130, 132 on each cylinder in the banks 104, 106. The conduit 114 includes a single 180-degree bend 134 that is located higher than the first and second banks of cylinders 104, 106 with respect to the longitudinal axis L. As shown in FIG. 15, the 180-degree bend 134 conveys the exhaust gas from a longitudinally upward directional flow shown at arrow 136 to a longitudinally downward directional flow shown at arrow 138 with respect to the longitudinal axis L. As shown in FIG. 13, the valley 108 has a center 140 located proximate to the cylinder block 103. The 180-degree bend 134 of the conduit 114 carries the exhaust gas radially outwardly as shown at arrow 142, away from the center 140 of the valley 108. As shown in FIG. 15, at least a portion of the conduit 114 extends out from (i.e. above) the top end 122 of the valley 108 and then back into (i.e. below) the top end 122 of the valley 108 with respect to the longitudinal axis L. Thus, at arrows 144, exhaust gas flows transversely from the first and second ports 130, 132. At arrows 146, exhaust gas flows through the 180-degree bend 134. At arrows 148, exhaust gas flows into and through the catalyst 126 in the catalyst receptacle 116.

Referring to FIG. 12, the conduit 114 includes a first branch conduit 150 receiving exhaust gas from the first bank of cylinders 104 and a second branch conduit 152 receiving exhaust gas from the second bank of cylinders 106. In this example, the first and second branch conduits 150, 152 are separated and are cast in the cylinder heads 110, 112 with the first and second banks of cylinders 104, 106. Referring to FIG. 14, the conduit 114 further includes a third branch conduit 154 receiving exhaust gas from the first and second branch conduits 150, 152 and discharging the exhaust gas through the catalyst receptacle 116. The exhaust gas that flows through the catalyst 126 is discharged through the lower end 153 of the third branch conduit 154 for subsequent discharge from the propulsion device in which the marine engine 101 is located.

A sealing interface 156 (FIG. 15) is provided between an upstream end 157 of the third branch conduit 154 and downstream ends 159, 161 of the first and second branch conduits 150, 152. The third branch conduit 154 is attached to the first and second branch conduits 150, 152 by a plurality of elongated fasteners that extend through the sealing interface 156. As shown in FIG. 14, the sealing interface 156 includes planar seal surfaces 158a, 158b, 158c disposed on the first, second and third branch conduits 150, 152 and 154. The planar sealing surface 158c of the third branch conduit 154 mates with the planar sealing surfaces 158a, 158b of the first and second branch conduits 150, 152. As shown in FIG. 15, the sealing interface 156 is located higher than the first and second banks of cylinders 106 with respect to the longitudinal axis L. The sealing interface 156 transversely extends to the longitudinal axis L.

Referring to FIG. 15, the third branch conduit 154 merges exhaust gas from the first and second branch conduits 150, 152 together at the 180-degree bend 134. The third branch conduit 154 comprises a first conduit portion 160 that receives exhaust gas from the first branch conduit 150, a second conduit portion 162 that receives exhaust gas from the second branch conduit 152, and a third conduit portion 164 that receives exhaust gas from the first and second conduit portions 160, 162. The first and second conduit portions 160, 162 form a 90-degree bend. The third conduit portion 164 forms a 90-degree bend. Together, the 90-degree bends form the noted 180-degree bend 134. The conduit 114 merges the exhaust gas from the first and second branch conduits 150, 152 together within the noted 180-degree bend 134.

A cooling jacket 170 is disposed along the conduit 114 from the lower end 153 to the sealing interface 156. The cooling jacket 170 carries cooling water for cooling the noted exhaust conduit 114 and catalyst 126. At the sealing interface 156, cooling water flows into cooling passages 172 in the first and second branch conduits 150, 152 (see FIG. 12) for cooling additional portions of the engine 101.

The prior disclosure thus provides a marine engine 101 comprising a cylinder block 103 having first and second banks of cylinders 104, 106 that are disposed along a longitudinal axis L and extend transversely with respect to each other in a V-shape so as to define a valley 108 there between. A catalyst receptacle 116 is disposed at least partially in the valley 108 and contains at least one catalyst 126 that treats exhaust from the marine engine 101. A conduit 114 conveys exhaust gas from the marine engine 101 to the catalyst receptacle 116. The conduit 114 receives the exhaust gas from the first and second banks of cylinders 104, 106 and conveys the exhaust gas to the catalyst receptacle 116. The conduit 114 reverses direction only once with respect to the longitudinal axis L. First and second ports 130, 132 communicate with each of the first and second banks of cylinders 104, 106, respectively. The conduit 114 receives exhaust gas from the first and second ports 130, 132. The conduit 114 includes a single 180-degree bend 134 that is located higher than the first and second banks of cylinders 104, 106 with respect to the longitudinal axis L. The 180-degree bend 134 conveys the exhaust gas from a longitudinally upward directional flow 136 to a longitudinally downward directional flow 138 with respect to the longitudinal axis L. The valley 108 has a center 140 located proximate to the cylinder block 103. The 180-degree bend 134 carries the exhaust gas radially outwardly as shown at 142, away from the center 140 of the valley 108. A portion of the conduit 114 extends out from a top end 122 of the valley 108 and then back into the top end 122 with respect to the longitudinal axis L. Exhaust gas flows transversely at 144 from the first and second ports 130, 132, through the 180-degree bend 134 at 146, and then into the catalyst receptacle 116 at 148. The conduit 114 includes a first branch conduit 150 receiving exhaust gas from the first bank of cylinders 104, a second branch conduit 152 receiving exhaust gas from the second bank of cylinders 106, and a third branch conduit 154 receiving exhaust gas from the first and second branch conduits 150, 152 and discharging the exhaust gas to the catalyst receptacle 116. The sealing interface 156 is disposed between the third branch conduit 154 and the first and second branch conduits 150, 152 and attached thereto by at least one elongated fastener that extends through the sealing interface 156. The sealing interface 156 includes a planar seal surface 158a, 158b, 158c that extends transversely to the longitudinal axis L. The sealing interface 156 is located higher than the first and second banks of cylinders 104, 106 with respect to the longitudinal axis L. The third branch conduit 154 merges exhaust gas from the first and second branch conduits 150, 152.

PRESENT DISCLOSURE

FIGS. 16-18 depict only portions of an internal combustion engine 201 for an outboard motor 202. In the aspects that are not shown, the internal combustion engine 201 is configured the same as the internal combustion engine 101 described herein above with reference to FIGS. 11-15. Similar to the engine 101, the internal combustion engine 201 is a 4-cylinder, 4-stroke, V-style engine. However, as with the previous examples, the concepts of the present disclosure are also applicable to internal combustion engines having any number of cylinders, including but not limited to 6- and 8-cylinder V-style engines in outboard, inboard and inboard/outboard marine engine configurations.

As shown by directional arrows in FIGS. 16 and 17, the outboard motor 202 is a three dimensional apparatus that longitudinally (here, vertically) extends with respect to a longitudinal axis 204, laterally extends with respect to a lateral axis 206 that is perpendicular to the longitudinal axis 204, and transversely extends with respect to a transverse axis 208 that is perpendicular to the longitudinal axis 204 and perpendicular to the lateral axis 206. Although not shown, just like the engine 101, the internal combustion engine 201 has a cylinder block that includes first and second banks of cylinders which are aligned (here, vertically aligned) with respect to the longitudinal axis 204. The first and second banks of cylinders extend transversely with respect to each other in a V-shape so as to define a valley 216 there between.

An exhaust manifold 218 conveys exhaust gas from the internal combustion engine 201. As in the example described herein above with reference to FIGS. 11-15, the exhaust manifold 218 has one or more inlet ports that receive the exhaust gas from the first bank of cylinders, one or more inlet ports that receive the exhaust gas from the second bank of cylinders, and an exhaust conduit 220 that merges and longitudinally conveys the exhaust gas from the noted first and second inlet ports. As shown in FIGS. 16 and 17, the exhaust conduit 220 is at least partially disposed in the valley 216.

As in the examples described herein above, the exhaust conduit 220 has a 180 degree bend that reverses the exhaust gas from an upstream, longitudinally upward directional flow to a downstream, longitudinally downward directional flow. As in the examples described herein above, the exhaust conduit 220 has a first branch conduit that receives the exhaust gas from the first bank of cylinders, a second branch conduit that receives the exhaust gas from the second bank of cylinders, and a third branch conduit that receives the exhaust gas from the first and second branch conduits and discharges the exhaust gas. A sealing interface 224 is disposed between the noted third branch conduit and first and second branch conduits. The sealing interface 224 is secured by a plurality of fasteners (not shown, but just as described herein above) that extend through the sealing interface 224. The sealing interface 224 is a planar sealing surface that extends transversely and laterally to the longitudinal axis 204. As in the examples described herein above, the sealing interface 224 is located vertically higher than the first and second banks of cylinders with respect to the longitudinal axis 204. As in the examples described herein above, an upstream portion of the exhaust conduit 220 is cast into the cylinder heads 232, 234 on the noted first and second banks of cylinders, whereas a downstream portion of the exhaust conduit 220 is fastened to the internal combustion engine 201 by fasteners at the noted sealing interface 224. Optionally, the downstream portion of the exhaust conduit 220 can include a catalyst housing 221 that houses a catalyst for treating the exhaust gas.

Through research and development, the present inventors have determined that is desirable to provide an improved arrangement that better secures the exhaust conduit 220 with respect to the internal combustion engine 201, particularly so as to accommodate manufacturing positional tolerances and thereby achieve a better seal at the sealing interface 224 during assembly, so as to reduce loads that are typically carried at the sealing interface 224, and so as to correctly locate the exhaust conduit 220 relative to the rest of the outboard motor structures.

As shown in FIGS. 16-18, the outboard motor 202 includes a supporting mechanism 226 that supports the exhaust conduit 220 with respect to the internal combustion engine 201. As further described herein below, the supporting mechanism 226 is specially configured to allow the exhaust conduit 220 to laterally move with respect to the internal combustion engine during, and optionally after assembly, for example towards and away from the internal combustion engine 201 with respect to the lateral axis 206. The supporting mechanism 226 is further specially configured to allow the exhaust conduit 220 to move during and optionally after assembly, for example 360 degrees in a plane defined by the lateral and transverse axes 206, 208.

In the illustrated example, the supporting mechanism 226 includes first and second slip joints 228, 230 that each couple the exhaust conduit 220 to the internal combustion engine 201, particularly to the respective first and second cylinder heads 232, 234. The first and second slip joints 228, 230 are disposed on opposite sides of the exhaust conduit 220 with respect to the transverse axis 208 and are set at an angle with respect to each other. The construction of the first and second slip joints 228, 230 can be the same, so the discussion herein below regarding one of the first and second slip joints 228, 230 can equally apply to the other of the first and second slip joints 228, 230. In addition, although the illustrated example shows two slip joints, the number of slip joints can vary and can include one or more than two slip joints.

Referring to FIG. 18, each slip joint 228, 230 has a first end 236 that is fixed with respect to the respective cylinder head 232, 234 on the internal combustion engine 201 and an opposite, second end 238 that is axially slideable back and forth, thereby allowing the noted lateral movement of the exhaust conduit 220 with respect to the internal combustion engine 201. In the illustrated example, each of the first and second slip joints 228, 230 has a fastener 240 having a threaded shank 242, a bushing 244 on the shank 242, and a boss 246 on the exhaust conduit 220. The shank 242 is engaged by threads with another boss 250 on one of the respective first or second cylinder heads 232, 234. The boss 246 on the exhaust conduit 220 is axially slide-able back and forth along the bushing 244, thereby allowing the noted lateral movement of the exhaust conduit 220. The bushing 244 is axially sandwiched between a head 252 on the elongated fastener 240 and the boss 250 on the respective first or second cylinder head 232, 234.

In the illustrated example, the slide-able boss 246 is on the exhaust conduit 220 and the elongated fastener 240 is fixed in the threaded engagement to the boss 250 on the internal combustion engine 201, more particularly on the respective first or second cylinder head 232, 234. However this could be switched so that in other examples, the slide-able boss 246 could be on the internal combustion engine 201, (e.g. on the first or second cylinder head 232, 234) and the elongated fastener 240 could be fixed in a threaded engagement to a fixed boss 250 on the exhaust conduit 220. In examples having two or more slip joints set at an angle to each other, the slip joints together laterally fix the exhaust conduit 220 in place, once the sealing interface 224 is connected. In examples having one or more than one slip joint set parallel to the lateral axis 206, the slip joints together allow continued lateral movement of the exhaust conduit 220, once the sealing interface 224 is connected.

The shank 242 has an outer diameter that is sized smaller than the inner diameter of the bushing 244 so that a radial gap (see arrows 248) exists between the shank 242 and the bushing 244. The elongated fastener 240 is thus 360 degrees radially moveable in the radial gap 248, thereby allowing 360 degree movement of the exhaust conduit 220 in a plane defined by the lateral and transverse axes 206, 208.

By facilitating movement in each of the longitudinal, lateral and transverse directions, the supporting mechanism 226 advantageously allows for better sealing at the sealing interface 224 during assembly of exhaust manifold 218 and the internal combustion engine 201, despite positional tolerances that may occur during the manufacturing process. The supporting mechanism 226 also advantageously helps reduce loads that are typically carried at the sealing interface 224 and helps to correctly locate the exhaust conduit 220 relative to the rest of the outboard motor structures during and after assembly thereof. In some examples, the supporting mechanism 226 can have only a single slip joint or several parallel slip joints such that the exhaust conduit 220 continues to be laterally movable with respect to the internal combustion engine 201 after assembly at the sealing interface 224. In the illustrated example, the first and second slip joints 228, 230 are set at an angle to each other so as to laterally fix the exhaust conduit 220 with respect to the internal combustion engine 201 once the connection at the sealing interface 224 is made.

The invention claimed is:

1. An outboard motor comprising:
   an internal combustion engine comprising a cylinder block having first and second banks of cylinders that are disposed along a longitudinal axis, the first and second banks of cylinders extending transversely with respect to each other in a V-shape so as to define a valley there between;
   an exhaust manifold that conveys exhaust gas from the internal combustion engine, the exhaust manifold comprising a first inlet port that receives the exhaust gas from the first bank of cylinders, a second inlet port that receives the exhaust gas from the second bank of cylinders, and an exhaust conduit that merges and longitudinally conveys the exhaust gas from the first and second inlet ports, wherein the exhaust conduit is at least partially disposed in the valley; and
   wherein the exhaust conduit is coupled to the first and second inlet ports at a sealing interface having a planar sealing surface that extends transverse to the longitudinal axis, and
   a supporting mechanism that supports the exhaust conduit with respect to the internal combustion engine, the supporting mechanism configured to allow the exhaust conduit to laterally move towards and away from the internal combustion engine along a lateral axis that is perpendicular to the longitudinal axis, thereby facilitating assembly of the exhaust manifold and the internal combustion engine despite positional tolerance differences there between.

2. The outboard motor according to claim 1, wherein the supporting mechanism comprises a first slip joint that couples the exhaust conduit to the internal combustion engine.

3. An outboard motor comprising:
   an internal combustion engine comprising a cylinder block having first and second banks of cylinders that are disposed along a longitudinal axis, the first and second banks of cylinders extending transversely with respect to each other in a V-shape so as to define a valley there between;
   an exhaust manifold that conveys exhaust gas from the internal combustion engine, the exhaust manifold comprising a first inlet port that receives the exhaust gas from the first bank of cylinders, a second inlet port that receives the exhaust gas from the second bank of cylinders, and an exhaust conduit that merges and longitudinally conveys the exhaust gas from the first and second inlet ports, wherein the exhaust conduit is at least partially disposed in the valley; and
   a supporting mechanism that supports the exhaust conduit with respect to the internal combustion engine, the supporting mechanism configured to allow the exhaust conduit to laterally move towards and away from the internal combustion engine along a lateral axis that is perpendicular to the longitudinal axis, thereby facilitating assembly of the exhaust manifold and the internal combustion engine despite positional tolerance differences there between;
   wherein the supporting mechanism comprises a first slip joint that couples the exhaust conduit to the internal combustion engine; and
   wherein the supporting mechanism further comprises a second slip joint that couples the exhaust conduit to the internal combustion engine, wherein the first and second slip joints are disposed on opposite sides of the exhaust conduit with respect to a transverse axis that extends perpendicular to the longitudinal axis and perpendicular to the lateral axis.

4. The outboard motor according to claim 3, wherein the first end and second slip joints are set at an angle with respect to each other so that the exhaust conduit is laterally fixed with respect to the internal combustion engine once the exhaust conduit is assembled with the internal combustion engine.

5. The outboard motor according to claim 3, wherein a first end of the first slip joint is fixed with respect to one of the exhaust conduit and the internal combustion engine and wherein an opposite, second end of the slip joint is axially slide-able back and forth with respect to the other of the exhaust conduit and the internal combustion engine, thereby allowing lateral movement of the exhaust conduit with respect to the internal combustion engine.

6. The outboard motor according to claim 4, wherein the first slip joint further comprises fastener having a shank, a bushing on the shank, and a boss on the other of the exhaust conduit and internal combustion engine, wherein the boss is axially slide-able back and forth along the bushing, thereby allowing the lateral movement of the exhaust conduit with respect to the internal combustion engine.

7. The outboard motor according to claim 5, wherein the bushing has an inner diameter and wherein the shank has an outer diameter that is sized smaller than the inner diameter of the bushing so that a radial gap exists between the shank and the bushing, wherein the elongated fastener is 360 degree radially movable in the radial gap, thereby allowing the exhaust conduit to move with respect to the internal combustion engine in 360 degrees in a plane defined by the lateral and transverse axes.

8. The outboard motor according to claim 6, wherein the boss is on the exhaust conduit and wherein the elongated fastener is fixed to the internal combustion engine.

9. The outboard motor according to claim 7, wherein the bushing is axially sandwiched between a head on the elongated fastener and a boss on the internal combustion engine.

10. The outboard motor according to claim 7, wherein a portion of the exhaust manifold is cast into the cylinder block and wherein another portion of the exhaust manifold is fastened onto the internal combustion engine.

11. An outboard motor comprising:
    an internal combustion engine comprising a cylinder block having first and second banks of cylinders that are disposed along a longitudinal axis, the first and second banks of cylinders extending transversely with respect to each other in a V-shape so as to define a valley there between;
    an exhaust manifold that conveys exhaust gas from the internal combustion engine, the exhaust manifold comprising a first inlet port that receives the exhaust gas from the first bank of cylinders, a second inlet port that receives the exhaust gas from the second bank of cylinders, and an exhaust conduit that merges and longitudinally conveys the exhaust gas from the first and second inlet ports, wherein the exhaust conduit is at least partially disposed in the valley; and a supporting mechanism that supports the exhaust conduit with respect to the internal combustion engine, the supporting mechanism configured to allow the exhaust conduit to laterally move towards and away from the internal combustion engine along a lateral axis that is perpendicular to the longitudinal axis, thereby facilitating assembly of the exhaust manifold and the internal combustion engine despite positional tolerance differences there between;

wherein the exhaust conduit comprises a 180-degree bend that reverses the exhaust gas from an upstream, longitudinally upward directional flow to a downstream, longitudinally downward directional flow, and wherein the supporting mechanism supports the exhaust conduit with respect to the internal combustion engine at a location downstream of the 180-degree bend.

12. The outboard motor according to claim 11, wherein the exhaust conduit comprises a first branch exhaust conduit receiving the exhaust gas from the first bank of cylinders, a second branch exhaust conduit receiving the exhaust gas from the second bank of cylinders, and a third branch exhaust conduit receiving the exhaust gas from the first and second branch exhaust conduits and discharging the exhaust gas; and further comprising a sealing interface between the third branch exhaust conduit and the first and second branch exhaust conduits.

13. The outboard motor according to claim 12, wherein the third branch exhaust conduit is attached to the first and second branch exhaust conduits by at least one elongated fastener that extends through the sealing interface.

14. The outboard motor according to claim 13, wherein the sealing interface comprises a planar sealing surface that extends transversely to the longitudinal axis.

15. The outboard motor according to claim 14, wherein the sealing interface is located higher than the first and second banks of cylinders with respect to the longitudinal axis.

16. An outboard motor comprising:
an internal combustion engine that longitudinally extends with respect to a longitudinal axis, laterally extends with respect to a lateral axis that is perpendicular to the longitudinal axis, and transversely extends with respect to a transverse axis that is perpendicular to the longitudinal axis and perpendicular to the lateral axis;
the internal combustion engine comprising a cylinder block having first and second banks of cylinders that are disposed along the longitudinal axis, the first and second banks of cylinders extending transversely with respect to each other in a V-shape so as to define a valley there between;
an exhaust manifold that conveys exhaust gas from the internal combustion engine, the exhaust manifold comprising a first inlet port that receives the exhaust gas from the first bank of cylinders, a second inlet port that receives the exhaust gas from the second bank of cylinders, and an exhaust conduit that merges and longitudinally conveys the exhaust gas from the first and second inlet ports, wherein the exhaust conduit is at least partially disposed in the valley; and
wherein the exhaust is coupled to the first and second inlet ports at a sealing interface having a planar sealing surface that extends transverse to the longitudinal axis, and
a supporting mechanism that supports the exhaust conduit with respect to the internal combustion engine, the supporting mechanism configured to allow the exhaust conduit to move with respect to the internal combustion engine in 360 degrees in a plane defined by the lateral and transverse axes, thereby facilitating assembly of the exhaust manifold and the internal combustion engine despite positional tolerance differences there between.

17. The outboard motor according to claim 16, wherein the supporting mechanism is further configured to allow the exhaust conduit to laterally move towards and away from the internal combustion engine.

18. An outboard motor comprising:
an internal combustion engine that longitudinally extends with respect to a longitudinal axis, laterally extends with respect to a lateral axis that is perpendicular to the longitudinal axis, and transversely extends with respect to a transverse axis that is perpendicular to the longitudinal axis and perpendicular to the lateral axis;
the internal combustion engine comprising a cylinder block having first and second banks of cylinders that are disposed along a longitudinal axis, the first and second banks of cylinders extending transversely with respect to each other in a V-shape so as to define a valley there between;
an exhaust manifold that conveys exhaust gas from the internal combustion engine, the exhaust manifold comprising a first inlet port that receives the exhaust gas from the first bank of cylinders, a second inlet port that receives the exhaust gas from the second bank of cylinders, and an exhaust conduit that merges and longitudinally conveys the exhaust gas from the first and second inlet ports, wherein the exhaust conduit is at least partially disposed in the valley; and
wherein the exhaust conduit is coupled to the first and second inlet ports at a sealing interface having a planar sealing surface that extends transverse to the longitudinal axis, and
a slip joint that is configured to allow the exhaust conduit to move 360 degrees in a plane defined by the lateral and transverse axes and laterally towards and away from the internal combustion engine, thereby facilitating assembly of the exhaust manifold and the internal combustion engine despite positional tolerance differences there between.

19. The outboard motor according to claim 18, wherein a first end of the first slip joint is fixed with respect to one of the exhaust conduit and the internal combustion engine and wherein an opposite, second end of the slip joint is axially slide-able back and forth with respect to the other of the exhaust conduit and the internal combustion engine, thereby allowing lateral movement of the exhaust conduit with respect to the internal combustion engine.

20. An outboard motor comprising:
an internal combustion engine that longitudinally extends with respect to a longitudinal axis, laterally extends with respect to a lateral axis that is perpendicular to the longitudinal axis, and transversely extends with respect to a transverse axis that is perpendicular to the longitudinal axis and perpendicular to the lateral axis;
the internal combustion engine comprising a cylinder block having first and second banks of cylinders that are disposed along a longitudinal axis, the first and second banks of cylinders extending transversely with respect to each other in a V-shape so as to define a valley there between;
an exhaust manifold that conveys exhaust gas from the internal combustion engine, the exhaust manifold comprising a first inlet port that receives the exhaust gas from the first bank of cylinders, a second inlet port that receives the exhaust gas from the second bank of cylinders, and an exhaust conduit that merges and longitudinally conveys the exhaust gas from the first and second inlet ports, wherein the exhaust conduit is at least partially disposed in the valley; and a slip joint that is configured to allow the exhaust conduit to move 360 degrees in a plane defined by the lateral and transverse axes and laterally towards and away from the internal combustion engine, thereby facilitating assembly of the exhaust manifold and the internal combustion engine despite positional tolerance differences there between;

wherein the first slip joint further comprises fastener having a shank, a bushing on the shank, and a boss on the other of the exhaust conduit and internal combustion engine, wherein the boss is axially slide-able back and forth along the bushing, thereby allowing the lateral movement of the exhaust conduit with respect to the internal combustion engine;

wherein a first end of the first slip joint is fixed with respect to one of the exhaust conduit and the internal combustion engine and wherein an opposite, second end of the slip joint is axially slide-able back and forth with respect to the other of the exhaust conduit and the internal combustion engine, thereby allowing lateral movement of the exhaust conduit with respect to the internal combustion engine; and wherein the bushing has an inner diameter and wherein the shank has an outer diameter that is sized smaller than the inner diameter of the bushing so that a radial gap exists between the shank and the bushing, wherein the elongated fastener is 360 degree radially movable in the radial gap, thereby the exhaust conduit to move with respect to the internal combustion engine in 360 degrees in a plane defined by the lateral and transverse axes.

* * * * *

UNITED STATES PATENT AND TRADEMARK OFFICE
CERTIFICATE OF CORRECTION

PATENT NO. : 9,903,251 B1
APPLICATION NO. : 15/363280
DATED : February 27, 2018
INVENTOR(S) : David J. Belter et al.

Page 1 of 1

It is certified that error appears in the above-identified patent and that said Letters Patent is hereby corrected as shown below:

In the Claims

In Claim 20, Column 15, Line 17: "combus-" should instead read --combustion engine, wherein the boss is axially slid-able back and forth along the bushing, thereby allowing the--

Signed and Sealed this
Tenth Day of April, 2018

Andrei Iancu
*Director of the United States Patent and Trademark Office*